United States Patent

[11] 3,559,710

| [72] | Inventor | Josephat R. Deslauriers |
| | | Renfrew, Ontario, Canada |
| [21] | Appl. No. | 747,905 |
| [22] | Filed | July 26, 1968 |
| [45] | Patented | Feb. 2, 1971 |
| [73] | Assignee | William Joseph Larocque |
| | | Field, Ontario, Canada |
| | | a part interest |

[54] TIRE OF SEPARABLE TREAD RING TYPE
5 Claims, 7 Drawing Figs.

[52] U.S. Cl. .................................................. 152/176,
152/210
[51] Int. Cl. ..................................................... B60c 11/02,
B60c 11/16
[50] Field of Search .......................................... 152/176,
187

[56] References Cited
UNITED STATES PATENTS

| 1,814,340 | 7/1931 | Shelton | 152/176 |
| 2,990,867 | 7/1961 | Barassi | 152/176 |
| 3,230,998 | 1/1966 | Del Cegno | 152/176 |
| 3,381,734 | 5/1968 | Barassi et al. | 152/176 |

*Primary Examiner*—Arthur L. LaPoint
*Attorney*—Weir, Marshall, MacRae and Lamb

ABSTRACT: A pneumatic tire of the separable tread ring type has a groove in its tread portion with an endless rubber belt removably seated in the groove. A plurality of metal studs are embedded in the belt, each stud being of one-piece form and having a flat base and a calk projecting from the surface of the belt. The base and a substantial portion of the calk of each stud are embedded in the belt, which has reinforcement cords overlying the bases of all the studs.

PATENTED FEB 2 1971
3,559,710
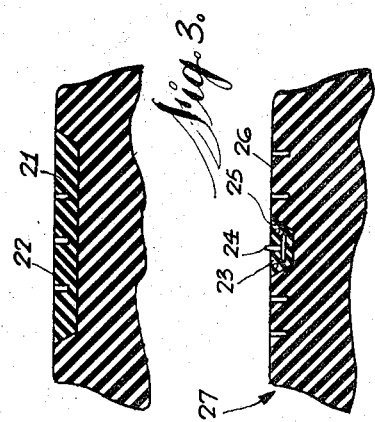
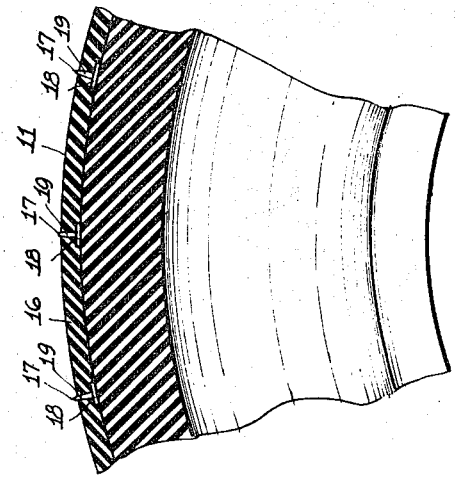
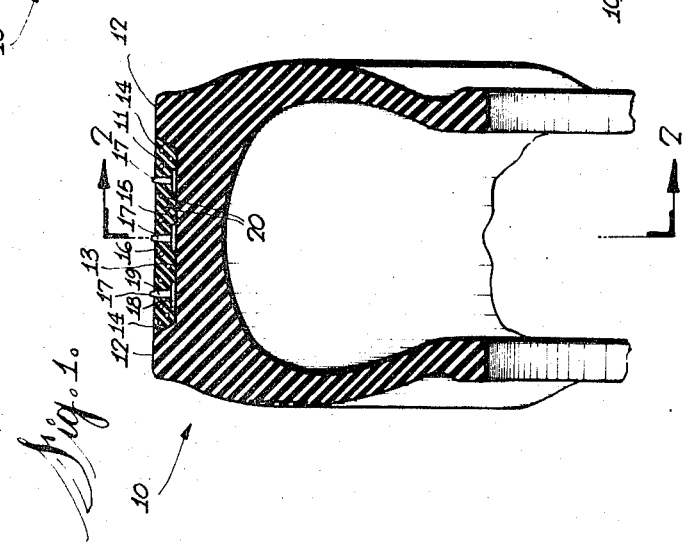

TIRE OF SEPARABLE TREAD RING TYPE

BACKGROUND OF THE INVENTION

1. Field of the invention

The invention is in the field of pneumatic tires of the replaceable or detachable tread ring type. 2. Description of the Prior Art Separable tread rings for pneumatic tires are well known in the art and many attempts have been made in the past to develop a satisfactory or practical form of such a tire. A number of U.S. Pat. relating to this inventive field have issued, including U.S. Pat Nos. 1,444,123; 2,426,974; 2,609,026; 2,707,014; 2,874,742; and 3,224,481. In some cases, it has been proposed to provide studs or calks in the tread ring.

SUMMARY OF THE INVENTION

The present invention is concerned with the provision of a metal-studded tire of use under ice, snow, and like conditions. Snow tires are now in widespread use and may be equipped with removable metal studs. Such tires require replacement by normal tires for summer driving and, since each such tire constitutes a complete unit, they are of costly nature. Since the metal studs, when used, are applied after formation of the tire, they are subject to displacement under normal driving conditions.

The present invention seeks to provide a tire structure having metal studs incorporated therein during manufacture thereof whereby such studs maintain their position in the structure under substantially all normal driving conditions but whereby the structure is readily convertible to summer driving condition by removal of a stud-carrying portion thereof.

BRIEF DESCRIPTION OF THE DRAWING

FIG. 1 is a cross-sectional view of a tire embodying the invention,

FIG. 2 is a longitudinal sectional view of the tire of FIG. 1,

FIG. 3 is a cross-sectional view of the tire of FIG. 1 having a studless tread ring therein, FIG. 4 is a cross-sectional view of a tire showing a modification of the invention, and FIG. 5 is a cross-sectional view of a tire showing another modification of the invention, and FIGS. 6 and 7 are partial cross-sectional views of ties tires showing other modified forms.

DESCRIPTION OF THE PREFERRED EMBODIMENTS

Referring to FIGS. 1 and 2, 10 is a pneumatic tire carcass of generally conventional structure and having a tread portion 11.

The surface of tread portion 11 is provided with a pair of circumferentially extending ribs 12 defining a groove 13 therebetween, the walls of such groove being substantially smooth and uninterrupted. Preferably, each side wall of the groove is inclined at an oblique angle to the bottom wall 15 thereof.

Seated in the groove 13 is a tread ring comprising an endless rubber belt 16. The term "rubber" is intended to include any natural or synthetic rubber or rubberlike material as conventionally employed in the construction of pneumatic tires.

The walls of the belt 16, as shown, are substantially coextensive with the complementary walls of the groove engaged thereby.

Embedded in the belt during manufacture thereof are a plurality of metal studs 17. Each stud 17 is of one-piece or unitary form to enhance the strength thereof. Each stud has a flattened base section 18 of major diameter and a calk section 19 of minor diameter. A major portion of the stud including the base and part of the calk sections is embedded in the body of the belt, with the tip portion of the calk section protruding above the belt surface as shown.

The belt includes longitudinally extending reinforcement cords 20 of rayon, nylon, metal, or the like, at least some of such cords overlying the base sections of the studs to more rigidly anchor the studs in the belt.

In the modification illustrated, the belt constitutes the major portion of the surface area of the tread portion of the tire. A plurality of circumferential rows (three as shown) of studs are positioned in the belt.

In use, the belt 16 is seated in the groove 13 when the tire is deflated and, on inflation, maintains a fixed position therein under all normal driving conditions.

Referring to FIG. 3, replacement of the belt 16 with a studless belt 21, having a suitable tread surface 22 formed therein, may be effected when desired. Under high temperature driving conditions, it may be desirably to employ a suitably adhesive to provide temporary adhesion of the belt to the groove walls.

The present invention also contemplates the provision of one or more relatively narrow studded belts on the tread portion of a tire which belts are readily removable and replaceably as desired without the necessity of replacement with studless belts. In this form of the invention the belt or belts constitute a minor portion of the tread surface of the tire.

FIG. 4 is illustrative of one such form of the invention wherein a single narrow belt 23 having a single row of studs 24 embedded therein is disposed in a complementary groove 25 in the tread portion 26 of a tire 27.

FIG. 5 shows another such form of the invention wherein two narrow belts 28, each having a single row of studs 29 embedded therein are disposed in complementary grooves 30 in the tread portion 31 of a tire 32.

FIG. 6 shows a slightly modified form wherein the sidewall 14 of the ring-receiving groove 13 is at a right angle to the bottom wall thereof.

FIG. 7 shows a modified form wherein the sidewall 14 of the ring-receiving groove 13 is at an acute angle to the bottom wall thereof.

I claim:

1. In a pneumatic tire of the separable tread ring type having a body carcass, a circumferential tread portion on said carcass, walls in said tread portion defining a groove, said groove walls being substantially smooth and in uninterrupted, a tread ring removably seated in said groove and comprising an endless belt of rubber having a plurality of circumferentially disposed reinforcement cords therein, a plurality of metallic studs embedded in said belt, each said stud being of one-piece structure and having a flattened base section of major diameter and a calk section of minor diameter, said base sections and the major portions of said calk sections being wholly encased within said belt and a minor portion of said calk section protruding from the surface of said belt, said reinforcing cords being disposed in overlying relation to said base sections of said studs.

2. The combination defined in claim 1, said belt constituting the major portion of the surface area of said tread portion.

3. The combination defined in claim 1, said belt having a flat bottom wall and flat sidewalls each extending at an oblique angle to said bottom wall.

4. The combination defined in claim 3, including a plurality of said grooves and one of said belts disposed in each of said grooves.

5. The combination defined in claim 4, said studs in each of said belts being arranged in a single circumferential groove.